(12) United States Patent
Rosenberg et al.

(10) Patent No.: US 10,820,197 B2
(45) Date of Patent: Oct. 27, 2020

(54) SELECTIVE DISABLEMENT OF SIP ENCRYPTION FOR LAWFUL INTERCEPT

(71) Applicant: AT&T Intellectual Property I, L.P., Atlanta, GA (US)

(72) Inventors: William Harry Rosenberg, Austin, TX (US); Mario Manuel Jardon, Pembroke Pines, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/973,925

(22) Filed: May 8, 2018

(65) Prior Publication Data

US 2019/0349759 A1    Nov. 14, 2019

(51) Int. Cl.
*H04W 12/02* (2009.01)
*H04W 64/00* (2009.01)
*H04W 8/06* (2009.01)

(52) U.S. Cl.
CPC ............. *H04W 12/02* (2013.01); *H04W 8/06* (2013.01); *H04W 64/00* (2013.01)

(58) Field of Classification Search
CPC ........ H04W 12/02; H04W 8/06; H04W 64/00
USPC ....................................................... 455/434
See application file for complete search history.

(56) References Cited

U.S. PATENT DOCUMENTS

| | | | |
|---|---|---|---|
| 9,450,752 B2 | 9/2016 | Vimpari et al. | |
| 2008/0305767 A1* | 12/2008 | Tahara | H04L 63/0428 455/410 |
| 2010/0208648 A1* | 8/2010 | Narkar | H04W 4/18 370/328 |
| 2012/0042085 A1* | 2/2012 | Boeszoermenyi | H04L 63/029 709/228 |
| 2012/0188941 A1* | 7/2012 | Li | H04W 76/50 370/328 |

(Continued)

FOREIGN PATENT DOCUMENTS

WO    WO 2017/157441 A1    9/2017
WO    WO 2017/203328 A1    11/2017

OTHER PUBLICATIONS

Karpagavinayagam et al.; "Monitoring Architecture for Lawful Interception in VoIP Networks"; IEEE Second Int'l Conf. on Internet Monitoring and Protection; 2007; 6 pages.

*Primary Examiner* — Charles N Appiah
*Assistant Examiner* — Nicole M Louis-Fils
(74) *Attorney, Agent, or Firm* — BakerHostetler

(57) ABSTRACT

Systems and methods for selectively disabling encryption for user equipment are disclosed. A technique comprises interrogating a location code of a device authenticated to a network through an encrypted connection and determining whether the location code corresponds to an unencrypted region. If the location code does not correspond to an unencrypted region, the technique comprises registering the device to the network for communication using the encrypted connection. If the location code corresponds to an unencrypted region, the technique comprises sending an intercept challenge to the device to re-authenticate the device to the network, the intercept challenge including parameters to establish an unencrypted connection, receiving re-registration information including unencrypted location information from the device using the unencrypted connection, and registering the device to the network using the unencrypted connection.

20 Claims, 12 Drawing Sheets

(56) References Cited

U.S. PATENT DOCUMENTS

| | | |
|---|---|---|
| 2012/0240216 A1 | 9/2012 | Fernandez Gutierrez |
| 2012/0275598 A1* | 11/2012 | Vimpari .................. H04L 9/088 380/255 |
| 2016/0021007 A1 | 1/2016 | Shuman et al. |
| 2016/0057592 A1 | 2/2016 | Tagg et al. |
| 2016/0183085 A1* | 6/2016 | Yerrabommanahalli .................... H04W 12/04 713/153 |
| 2017/0064544 A1* | 3/2017 | Youn ..................... H04W 12/02 |
| 2017/0237600 A1 | 8/2017 | Patel et al. |

\* cited by examiner

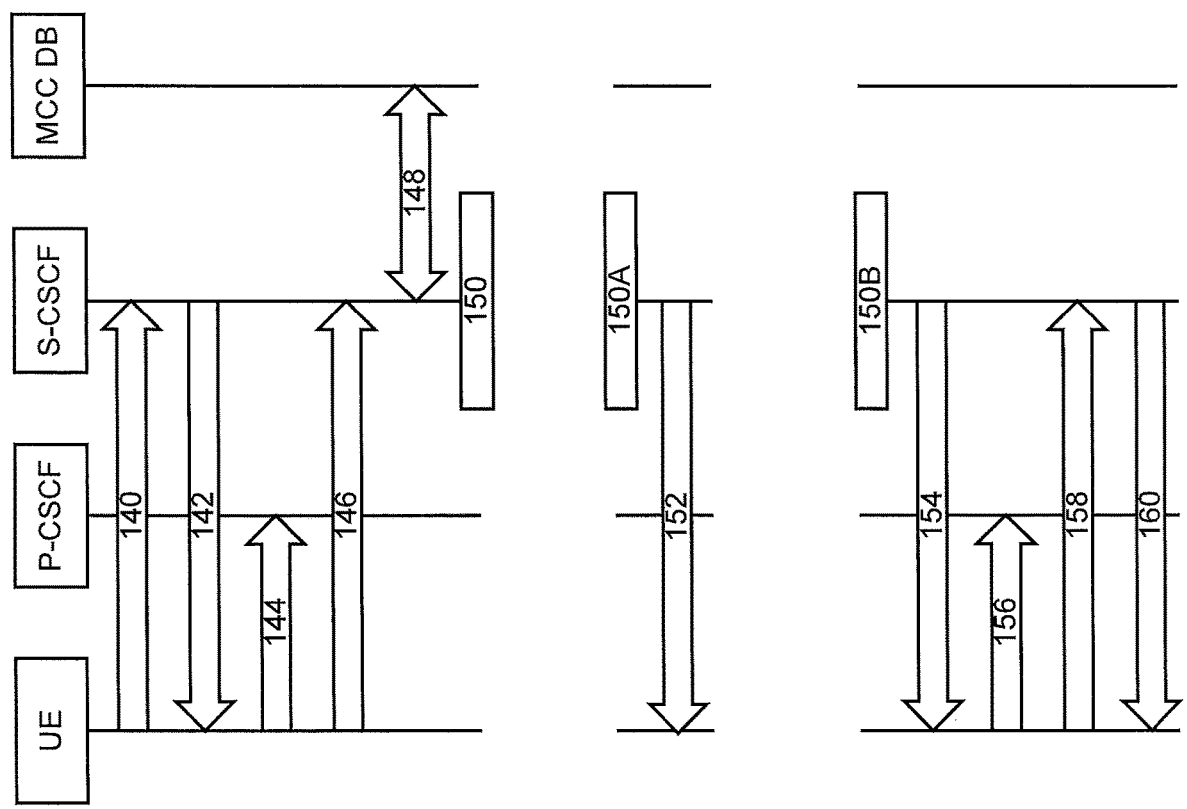

SELECTIVE DISABLEMENT OF SIP ENCRYPTION FOR LAWFUL INTERCEPT

TECHNICAL FIELD

The disclosure generally relates to wireless communication, and more particularly relates to enablement and disablement of security protocols for devices in wireless networks.

BACKGROUND

Long-Term Evolution (LTE) is a standard for high-speed wireless communication. S8 Home Routing (S8HR) is the architecture within LTE used for Voice over LTE (VoLTE) roaming. Using this approach, a user roaming on another operator's network still uses its own home network IMS infrastructure for voice calling, with the roaming network used for transport. The Session Initiation Protocol (SIP) connection between the user's device and the home network IMS infrastructure for VoLTE (and other communications) may be protected by an IPsec (internet protocol security) tunnel which includes encryption.

A problem arises because there is not the ability to monitor and intercept calls lawfully when such calls are made by roamers using devices not native to their local networks. Since the connection between the device and the home infrastructure may be encrypted, it cannot be monitored by the roaming network in some cases.

SUMMARY

In an example, a method comprises interrogating a location code of a device authenticated to a network through an encrypted connection and determining whether the location code corresponds to an unencrypted region. If the location code does not correspond to an unencrypted region, the method comprises registering the device to the network for communication using the encrypted connection. If the location code corresponds to an unencrypted region, the method comprises sending an intercept challenge to the device to re-authenticate the device to the network, the intercept challenge including parameters to establish an unencrypted connection, receiving re-registration information including unencrypted location information from the device using the unencrypted connection, and registering the device to the network using the unencrypted connection.

In another example, a system includes a proxy call session control function (P-CSCF) configured to open an encrypted connection between a device and an internet protocol multimedia subsystem (IMS), wherein the P-CSCF is further configured to open an unencrypted connection between the device and the IMS. The system further comprises a serving call session control function (S-CSCF) configured to receive registration information from the device, wherein the S-CSCF is further configured to provide an initial challenge to the device including connection parameters for opening an encrypted connection between the device and the IMS, and wherein the S-CSCF is further configured to provide an intercept challenge to the device including connection parameters for opening an unencrypted connection between the device and the IMS. The system further comprises a location component including a location comparator and a location database, wherein the location comparator compares a device location received by the S-CSCF over the encrypted connection to unencrypted region locations in the location database, and wherein the intercept challenge is sent to the device in response to matching the device location with one of the unencrypted region locations.

In another example, a non-transitory computer readable medium stores instructions. When executed by a processor, the instructions cause performance of aspects comprising interrogating a location code of a device authenticated to a network through an encrypted connection and determining whether the location code corresponds to an unencrypted region. If the location code does not correspond to an unencrypted region, the instructions cause registering the device to the network for communication using the encrypted connection. If the location code corresponds to an unencrypted region, the instructions cause sending an intercept challenge to the device to re-authenticate the device to the network, the intercept challenge including parameters to establish an unencrypted connection, receiving re-registration information including unencrypted location information from the device using the unencrypted connection, and registering the device to the network using the unencrypted connection.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Aspects of the disclosure are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIGS. 1A and 1B illustrate example message flows to authenticate and/or register user equipment to a network.

DETAILED DESCRIPTION

Possible solutions for providing intercept capability in jurisdictions or regions where this capability is required (e.g., for roaming users, for other groups of users) while still conforming to wireless standards include total disablement of encryption regardless of location or the development of entirely separate unencrypted infrastructure dependent on geography. It is not desirable to globally disable encryption for all VoLTE users. More, dedicated network infrastructure specifically for roaming traffic where encryption is disabled voice signaling traffic (or other communications) would be costly and difficult to maintain.

This disclosure provides a lower burden, interoperable solution that does not wholly disable encryption. This is accomplished by making the IPsec negotiation dependent on the roaming network or country, providing more security options on a per-network or per-country basis. However, a difficulty exists because device location may not be known during IPsec negotiation.

This challenge is overcome by adding intelligence and additional procedures to certain nodes handling authentication and registration on networks. Specifically, after an initial registration request is approved over an encrypted channel, the network may become aware of device location. Before ending the registration process, a new challenge can be sent to devices determined to be in unencrypted regions, whereby the device is re-authenticated over an unencrypted channel now that the location confirms this requirement.

Figure 1A:
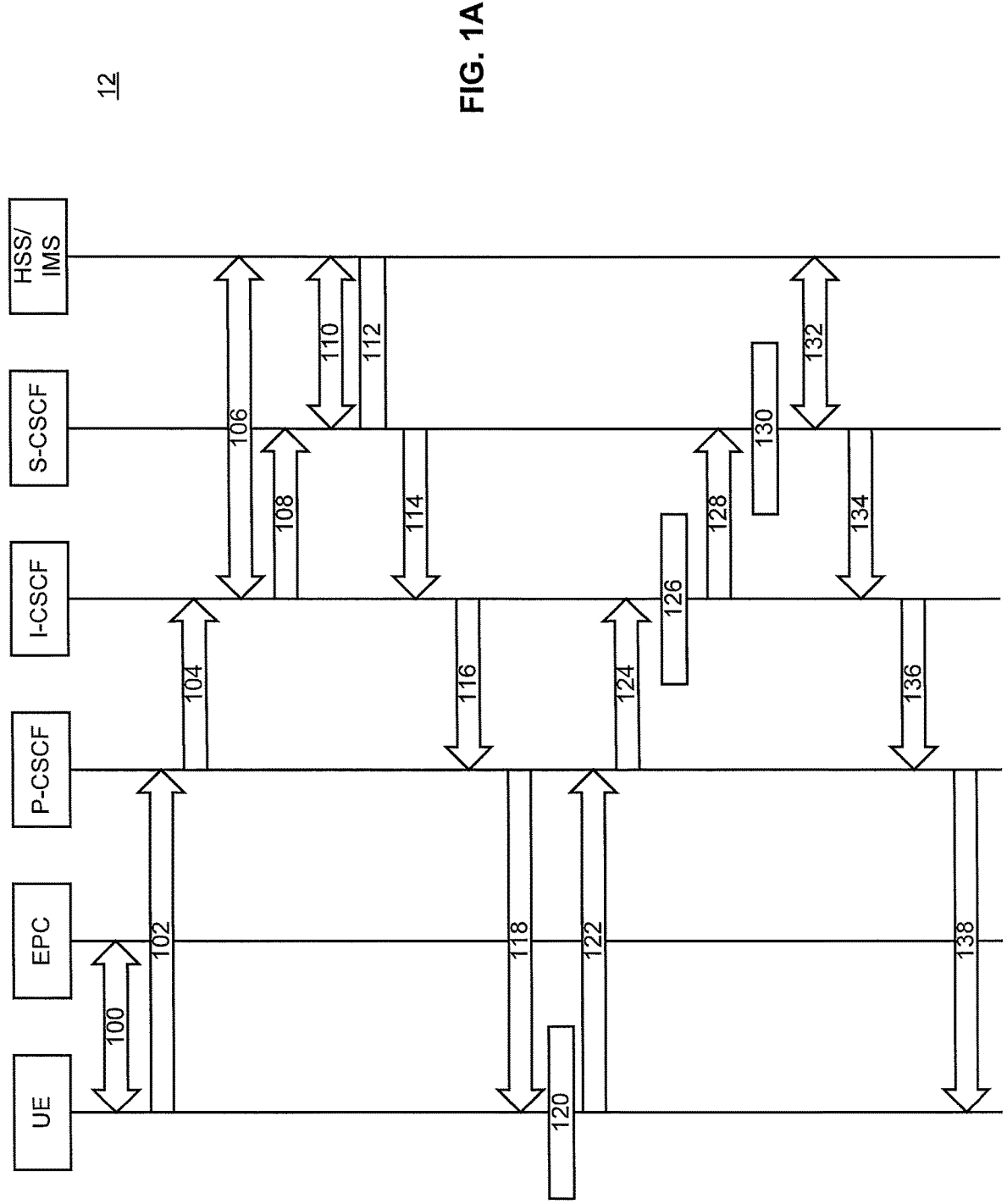

FIGS. 1A and 1B illustrate example communication flows to register user equipment to a network. FIG. 1A illustrates a message flow using SIP) encryption and FIG. 1B illustrates a message flow which can selectively disable SIP encryption.

FIG. 1A shows communication flow 12 for registering user equipment to a network according to, e.g., 3rd Generation Partnership Project (3GPP) standards using encryption. Communication at 100 establishes call session control function (CSCF) discovery (e.g., discovery of the proxy CSCF (P-CSCF) and context (e.g., evolved packet system bearer (EPS bearer)) between the user equipment and the network core (e.g., evolved packet core (EPC)). At 102, the user equipment sends registration information to the P-CSCF. In embodiments, registration information can be sent alternatively or complementarily to nodes such as session border control (SBC), access transfer control function (ATCF), access transfer gateway (ATGW), et cetera. At 104, the P-CSCF (or other element) communicates with an interrogating CSCF (I-CSCF) to register the UE. This includes communication of the session transfer number for single radio voice call continuity (STN-SR) and ATCF address. Thereafter, the I-CSCF engages in two-way communication with the home subscriber server (HSS) of an internet protocol multimedia subsystem (IMS) to conduct a user registration status query. This can be communicated over a Cx interface and employ User-Authorization-Request (UAR) and User-Authorization-Answer (UAA) commands. Thereafter at 108 the I-CSCF communicates with the S-CSCF to register the UE. This includes communication of the session transfer number for single radio voice call continuity (STN-SR) and ATCF address. At 110, Multimedia-Authorization-Request (MAR) and Multimedia-Authorization-Answer (MAA) are communicated between the S-CSCF and HSS. The HSS generates authentication vectors (AVs) (using, e.g., using EPS authentication and key agreement protocol (AKA) algorithms) and an AV is selected at 112. A SIP 401 message (or similar message) is transmitted from the S-CSCF to the I-CSCF at 114, then to the P-CSCF at 116, and finally to the UE at 118.

At 120, the UE generates response and session keys for the selected AV. Using this and other information, the UE transmits registration data to the P-CSCF at 122. At 124, the P-CSCF (or other element) again communicates with an I-CSCF to register the UE. This includes communication of the session transfer number for STN-SR and ATCF address. At 126, the S-CSCF is located, and at 128 the I-CSCF communicates with the S-CSCF to register the UE. This includes communication of the session transfer number for STN-SR and ATCF address. At 130, authentication is completed, and at 132 the S-CSCF and HSS engage in two-way communication using the Cx interface to transmit and receive Server-Assignment-Request (SAR) and Server-Assignment-Answer (SAA) messages and registration notification. Thereafter, a SIP 200 message (or similar message) is transmitted from the S-CSCF to the I-CSCF at 134, then to the P-CSCF at 136, and finally to the UE at 138. This completes registration of the UE to the IMS.

While certain details of FIG. 1A are particular to initial IMS registration using AKA authentication in LTE Phase 3 environments, it is understood that alternatives in other environments can be utilized without departing from the scope or spirit of the innovation. More, while particular functions are described as being performed by particular elements, it is understood that elements can be combined or functions performed by alternative elements while still utilizing aspects of the disclosure herein.

FIG. 1B illustrates a message flow 14 whereby encryption can be selectively disabled (e.g., in accordance with the requirements of unencrypted regions such as lawful intercept jurisdictions). At 140, the UE sends SIP register information to the S-CSCF. This information can include IPsec client data but no private header (e.g., P-Access-Network-Info (PANI) header) including location information. At 142, the S-CSCF returns a SIP 401 message (or similar message) indicating that the IPsec for connection is negotiated with encryption. At 144, the UE communicates with the P-CSCF to open a transmission control protocol (TCP) socket for an IPsec tunnel including encryption, which enables the transmission of location information according to various network standards. At 146, the UE sends SIP registration information in the form of a challenge response with a private header to complete authentication on and registration to the network via the S-CSCF. Based on this authentication, location information relating to the UE is discerned. This location information can include a mobile country code (MCC). Alternatively, other codes or location information can be used. The P-CSCF and S-CSCF can communicate to assist with authentication or other aspects of message flow 14 (and other systems and methods disclosed herein). For example, at 146, a flag (e.g., "is_encrypted") can be added by the P-CSCF to inform the S-CSCF is presently using an encrypted IPSec tunnel. The S-CSCF can use the presence or absence of this flag (or the value of another variable) to trigger querying of the MCC database.

At 148, the S-CSCF communicates with the MCC database (or other location database) and the MCC (or other location information) is compared to codes therein to determine at 150 whether the UE is associated with a location requiring lawful intercept capability.

If the determination at 150 resolves that the UE location does not match an unencrypted region (e.g., a lawful intercept jurisdiction)—the outcome at 150A—the S-CSCF transmits a SIP 200 message (or similar message) back to the UE to complete authentication and registration at 154. The P-CSCF and S-CSCF can communicate to assist with authentication or other aspects of message flow 14 (and other systems and methods disclosed herein). For example, at 154, the S-CSCF can add a flag (e.g., disable encryption)

to trigger the P-CSCF to disable encryption in the subsequent challenge delivered to the UE. Such a flag (or the value of another variable) assists operation because the IPSec tunnel terminates at the P-CSCF and the S-CSCF does not know its characteristics. Therefore, to complete registration, the S-CSCF is aware whether encryption is in use and can command the P-CSCF to disable encryption if it is not. Using such techniques, the UE is registered with encryption in regions or jurisdictions which do not require lawful intercept.

If the determination at 150 resolves that the UE location matches an unencrypted region—the outcome at 150B—the S-CSCF transmits a SIP 401 message (or similar message) back to the UE to re-register the UE without encryption at 156. IPsec between the UE and network is negotiated without encryption, and at 158 a new TCP socket is opened between the UE and the P-CSCF without encryption. At 160, the UE sends SIP registration information—a challenge response which may include a private header—to the S-CSCF. In embodiments, the conversation between the UE, S-CSCF, and/or P-CSCF can be supplemented with information to inform the network elements that new registration should proceed without encryption to avoid a looping condition (e.g., repeatedly sending SIP 401 messages). Following confirmation of the challenge response, the S-CSCF transmits a SIP 200 message (or similar message) to the UE at 162. This completes registration of the UE without encryption to allow lawful intercept.

While FIG. 1B illustrates one embodiment, it is understood that alternative or complementary embodiments (involving, e.g., a greater number of network elements as in FIG. 1A) can be implemented using similar procedures (e.g., selectively re-registering using an unencrypted connection after discovering location over an encrypted connection during initial registration). For example, a message flow could involve, e.g., an EPC, an I-CSCF, an HSS, or other elements without departing from the scope or spirit of the innovation.

Figure 1C:
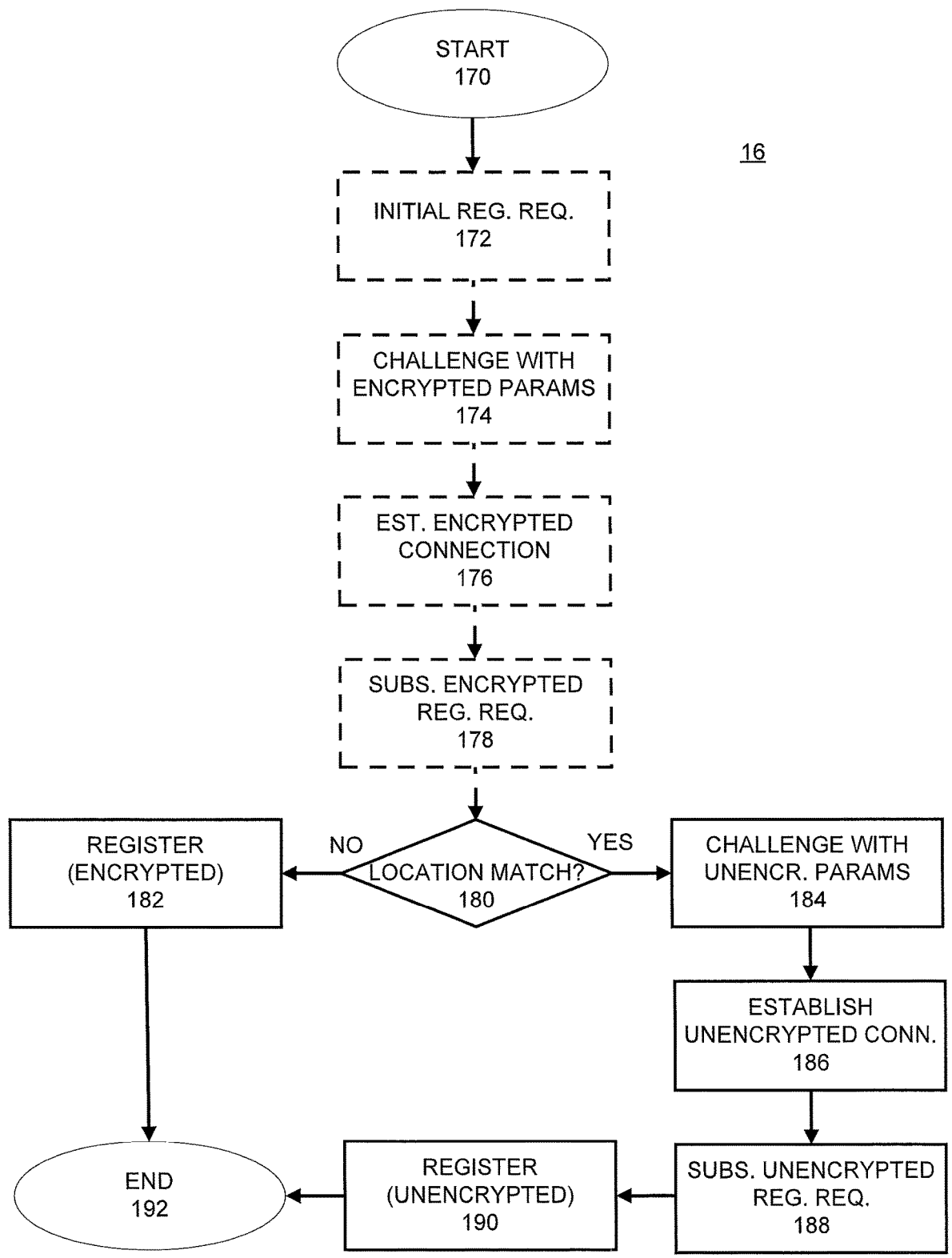
FIG. 1C illustrates an example method for selectively disabling encryption in accordance with the disclosure.

FIG. 1C illustrates a flow chart of an example methodology 16 for selectively enabling encryption based on lawful intercept requirements. Methodology 16 begins at 170 and may proceed through aspects 172-178 to perform initial registration in accordance with network standards. However, in embodiments of methodology 16 (or alternative methods disclosed herein) methodology 16 can proceed from 170 to 180 where location information is collected in an alternative manner or where a device already registered to a network is being interrogated to confirm its compliance with lawful intercept requirements.

Assuming the device is beginning its interaction with the network, at 172 an initial registration request can be received by one or more network elements. This can include, e.g., an unprotected registration request (to register to, e.g., an IMS) with credentials, which does not include the device location (which can be included in PANI). The registration request includes the IPsec algorithms that the device supports.

At 174, a network element challenges the device (e.g., a SIP 401 challenge or similar message) to authenticate the UE, which also includes the IPsec algorithms for integrity and encryption that the network chooses from the device-provided list. As techniques disclosed herein may send subsequent challenges to selectively disable SIP encryption, this may be referred to as an "initial challenge." Thereafter, at 176, an encrypted connection is established between the UE and the network using the agreed parameters including encryption. The UE or the network can establish the connection based on the parameters at 176 (or later at 186).

At 178, a registration request is received from the UE over the encrypted IPsec tunnel with the authentication results. Since this message is IPsec protected, it includes the device location.

After 178, or if the device has already engaged in interaction with the network, at 180 a determination is made as to whether a device location matches to an unencrypted region. Aspects include interrogating a location code of a device authenticated to a network through an encrypted connection and determining whether the location code corresponds to an unencrypted region. The location code may be an MCC, and it may be compared to location codes in an MCC database. The MCC database may include a list of any number of locations, either as a list of locations imposing lawful intercept requirements, or as a list (or lists) of locations which may or may not impose lawful intercept requirements with such being indicated by a field associated with the location entry.

If the determination at 180 returns negative—that is, the location of the UE does not correspond to an unencrypted region—methodology 16 proceeds to 182 where the network accepts the authentication results if valid and sends a SIP 200 (or similar message) to end the registration process using an encrypted connection. Thereafter, methodology 16 ends at 192.

If, however, the determination at 180 returns positive, meaning the location of the UE matches an unencrypted region, methodology 16 proceeds to 184 where re-registration is performed to register the UE to the network using unencrypted connections which comply with lawful intercept requirements. At 184, a network element sends another challenge (an "intercept challenge") to the device to re-authenticate the device to the network. The intercept challenge including parameters to establish an unencrypted connection. This can include, e.g., a P-CSCF sending another SIP 401 challenge (or similar message) which does not enable encryption as part of the IPsec negotiation. The intercept challenge can include a reason header to assist with its interpretation or handling. Thereafter, at 186, a subsequent unencrypted IPsec connection can be established, and at 188 the UE can send a subsequent registration request over the unencrypted IPsec tunnel with authentication results. Because this subsequent request is IPsec protected, it includes location information. Thereafter, at 190, the network accepts the UE authentication results (if valid) and sends a SIP 200 (or similar message) complete UE registration to the network with SIP encryption selectively disabled. Thereafter, at 192, methodology 16 ends.

Figure 2:
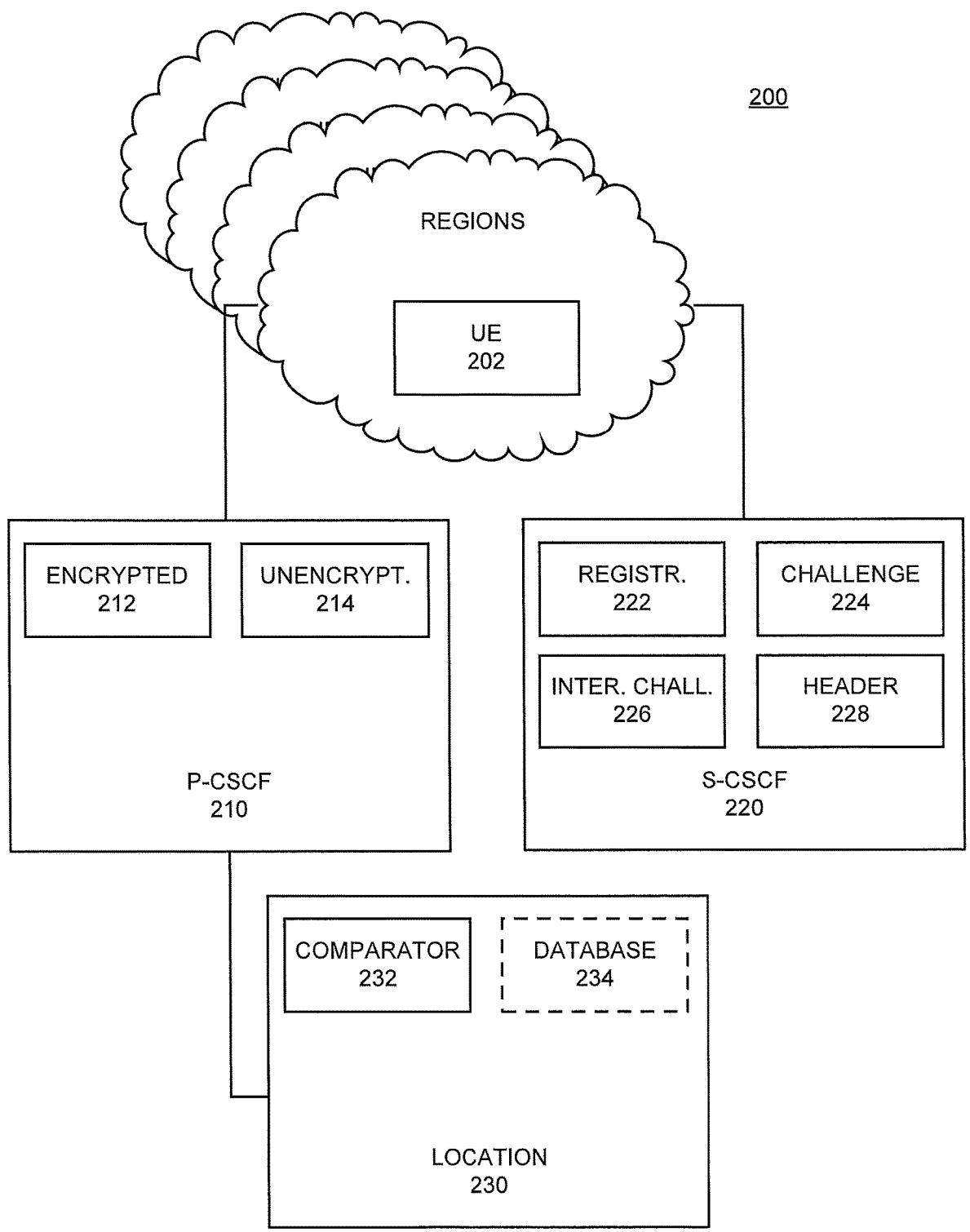
FIG. 2 illustrates an example system for selectively disabling encryption in accordance with the disclosure.

Turning to FIG. 2, this drawing illustrates an example system 200 for selectively disabling encryption to UE. UE 202 exists in one of a plurality of regions. UE 202 may be a mobile device, and may therefore travel through various regions or jurisdictions. Each jurisdiction may have its own legal or regulatory framework for mobile devices, including some which require lawful intercept or increased tracking capability. Networks with which UE 202 interact may not be aware, without taking action, that UE 202 is in an unencrypted region (e.g., a lawful intercept jurisdiction). System 200 can use SIP messages or codes in its interaction with UE 202.

System 200 includes P-CSCF 210 which is configured at least to open an encrypted connection between a device and an internet protocol multimedia subsystem (IMS), wherein the P-CSCF is further configured to open an unencrypted connection between the device and the IMS.

To perform these functions, P-CSCF 210 can include an encrypted communication component 212 and an unencrypted communication component 214. In embodiments, these may be the same component, and/or encrypted and unencrypted communication can travel through the same physical or logical paths. Further, one or more of these components can be integrated into other P-CSCF elements or sub-functions. In an embodiment, P-CSCF can create or remove various sockets or tunnels (e.g., IPsec tunnels) to manage communication with UE 202 and/or other UE.

System 200 also includes S-CSCF 220 which is configured at least to receive registration information from the device. S-CSCF 220 is further configured to provide an initial challenge to the device including connection parameters for opening an encrypted connection between the device and the IMS. In addition, S-CSCF is 220 configured to provide an intercept challenge to the device including connection parameters for opening an unencrypted connection between the device and the IMS.

To perform these functions, S-CSCF 220 can include a registration component 222 (which can handle registration received from UE 202 and other UE), an initial challenge component 224, an intercept challenge component 226, and a header component 228 (which can provide a reason header for one or more challenges). In embodiments, two or more of these may be the same component, and/or processed or transmitted using similar elements of S-CSCF. Further, one or more of these components can be integrated into other S-CSCF elements or sub-functions.

System 200 further includes location component 230. Location component 230 can include location comparator 232 and location database 234. Location comparator 232 is configured to at least compare a device location received by the S-CSCF over the encrypted connection to unencrypted region locations in location database 234. The intercept challenge is sent to the device in response to matching the device location with one of the unencrypted region locations. Location database 234 is configured to store information indicating whether locations therein are unencrypted regions. Location component 230, location comparator 232, and/or location database 234 can be integrated into other components or stored at other locations accessible through the network. In non-limiting examples, some or all of the elements of location component 230 could be stored in P-CSCF 210 or a communicatively coupled HSS.

While system 200 is illustrated in a particular arrangement for purposes of explanation, it is understood that some or all of the functions performed by, P-CSCF 210, S-CSCF, and/or location component 230 can be completed by other components in any combination without departing from the scope or spirit of the innovation.

Figure 3:
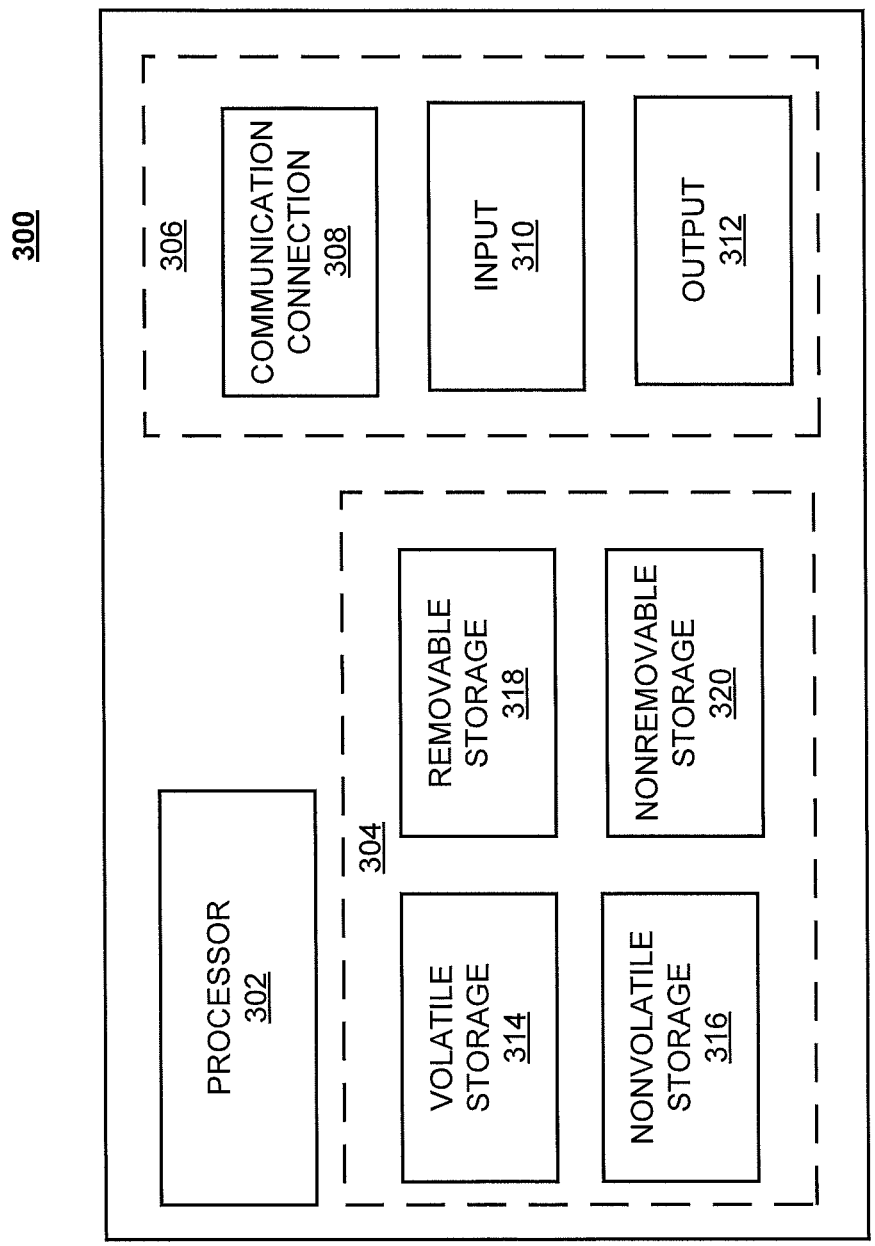
FIG. 3 is a schematic of an example network device.

FIG. 3 is a block diagram of network device 300 that may be connected to or comprise a component of cellular network 112 or wireless network 114. Network device 300 may comprise hardware or a combination of hardware and software. The functionality to facilitate telecommunications via a telecommunications network may reside in one or combination of network devices 300. Network device 300 depicted in FIG. 3 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an ALFS, a gateway mobile location center (GMLC), a radio access network (RAN), a serving mobile location center (SMLC), or the like, or any appropriate combination thereof. It is emphasized that the block diagram depicted in FIG. 3 is example and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 3) to allow communications there between. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a nonremovable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 4:
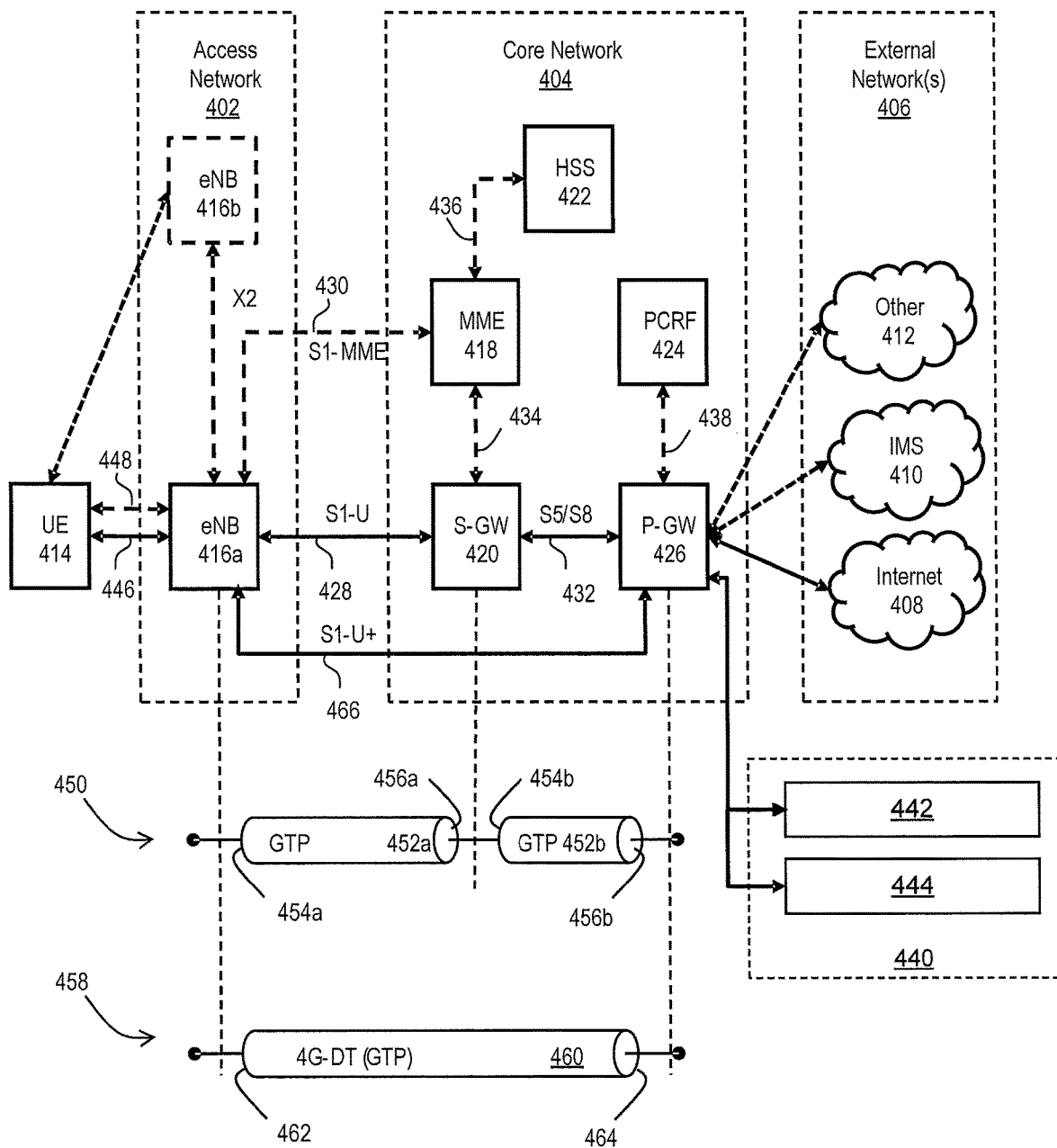
FIG. 4 depicts an example communication system that provide wireless telecommunication services over wireless communication networks.

FIG. 4 illustrates a functional block diagram depicting one example of an LTE-EPS network architecture 400 related to the current disclosure. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3GPP, with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, tHSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The "Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 4. In other words, either or both of access network 402 and the core network 404 can include additional network elements that are not shown, such as various routers, switches and controllers. In addition, although FIG. 4 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 4. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel Solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 5:
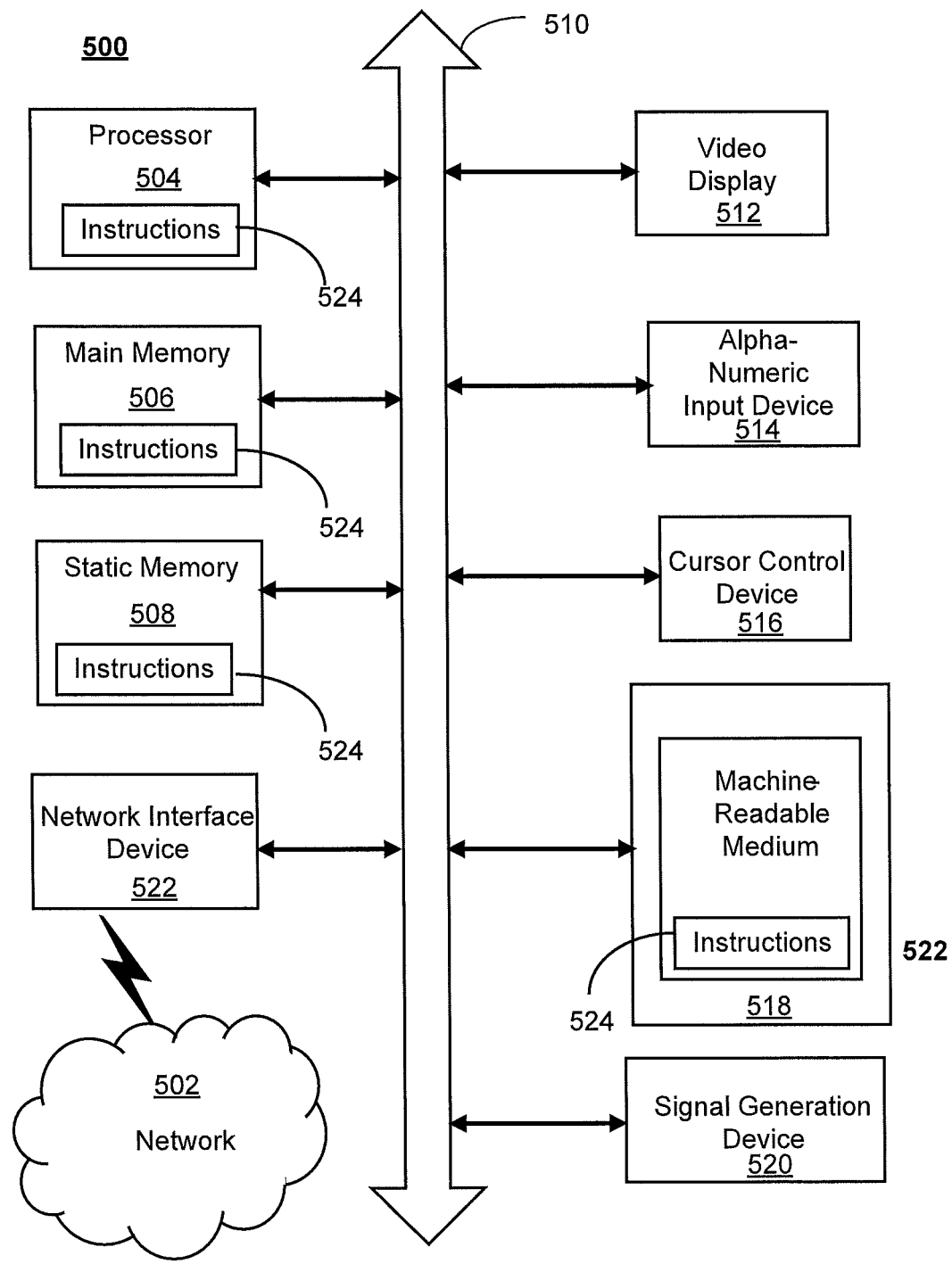
FIG. 5 depicts an example communication system that provide wireless telecommunication services over wireless communication networks.

FIG. 5 depicts an example diagrammatic representation of a machine in the form of a computer system 500 within which a set of instructions, when executed, may cause the machine to perform any one or more of the methods described above. One or more instances of the machine can operate, for example, as processor 302, UE 414, eNB 416, MME 418, SGW 420, HSS 422, PCRF 424, PGW 426 and other devices of FIGS. 1, 2, and 4. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor 504 (or controller) (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 6:
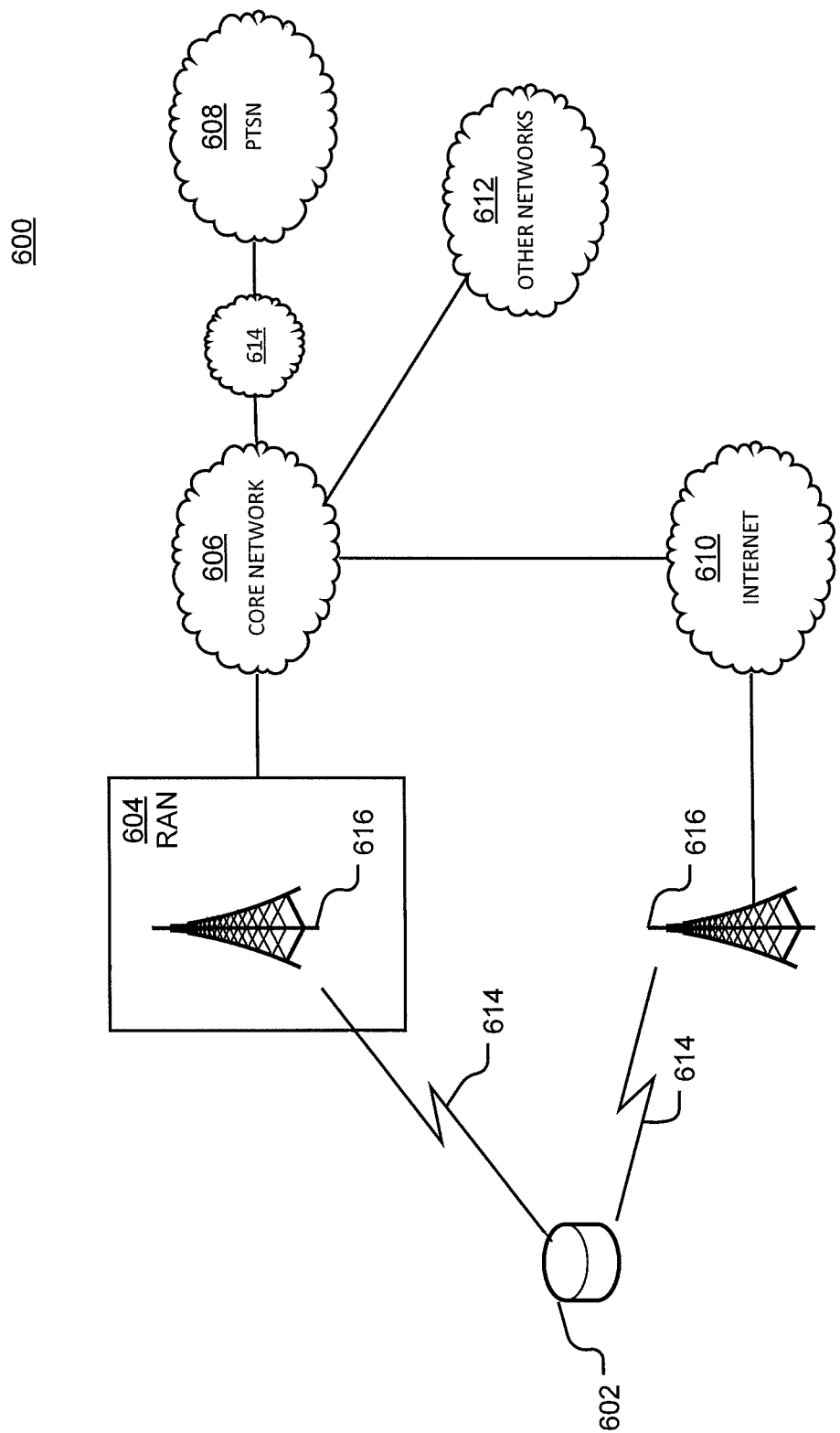
FIG. 6 is a diagram of an example telecommunications system in which the disclosed methods and processes may be implemented.

As shown in FIG. 6, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device, network device 300, or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 6, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 6, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 7:
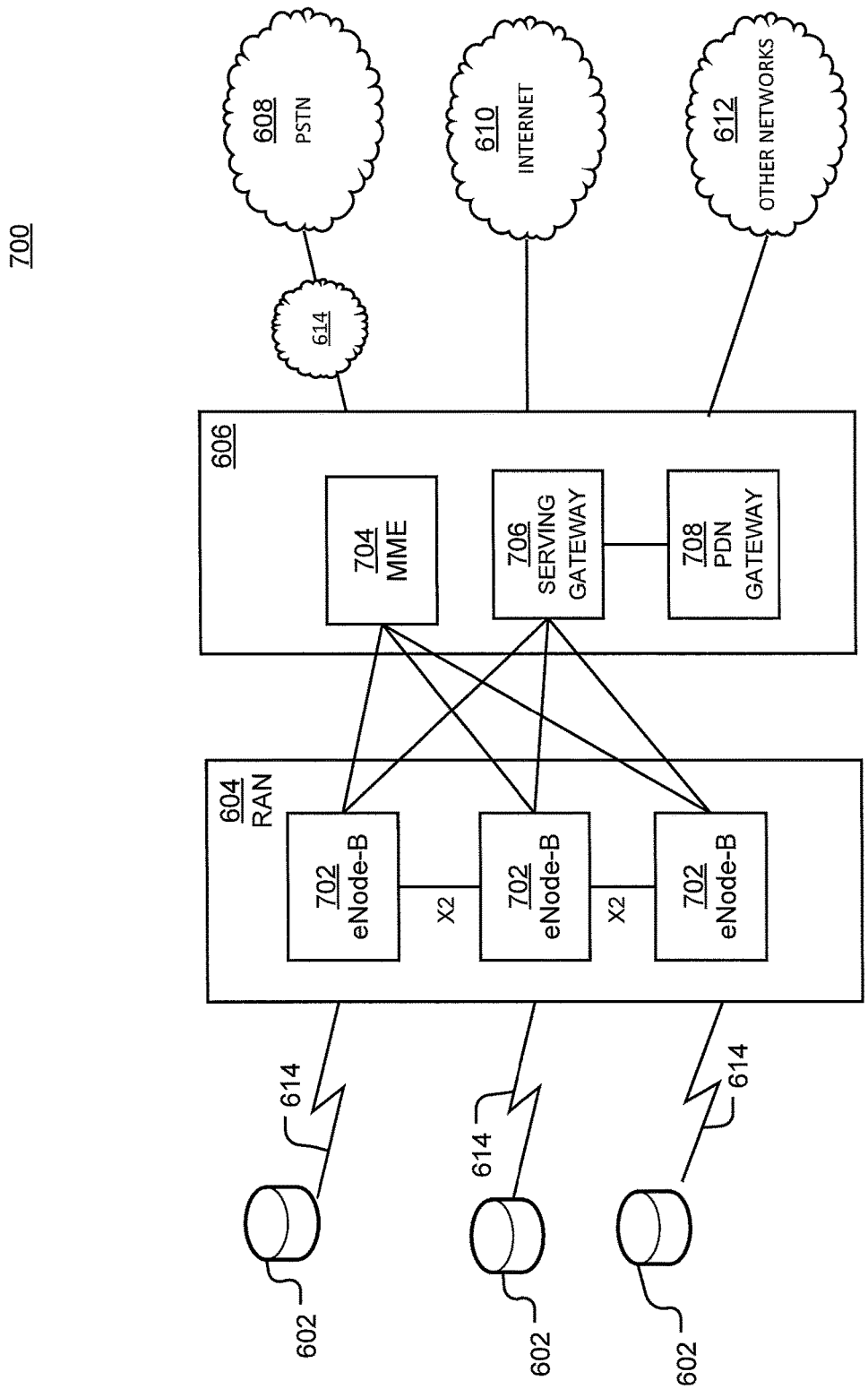
FIG. 7 is an example system diagram of a radio access network and a core network.

FIG. 7 is an example system 600 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 7 eNode-Bs 702 may communicate with one another over an X2 interface.

Core network 606 shown in FIG. 7 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers.

Figure 8:
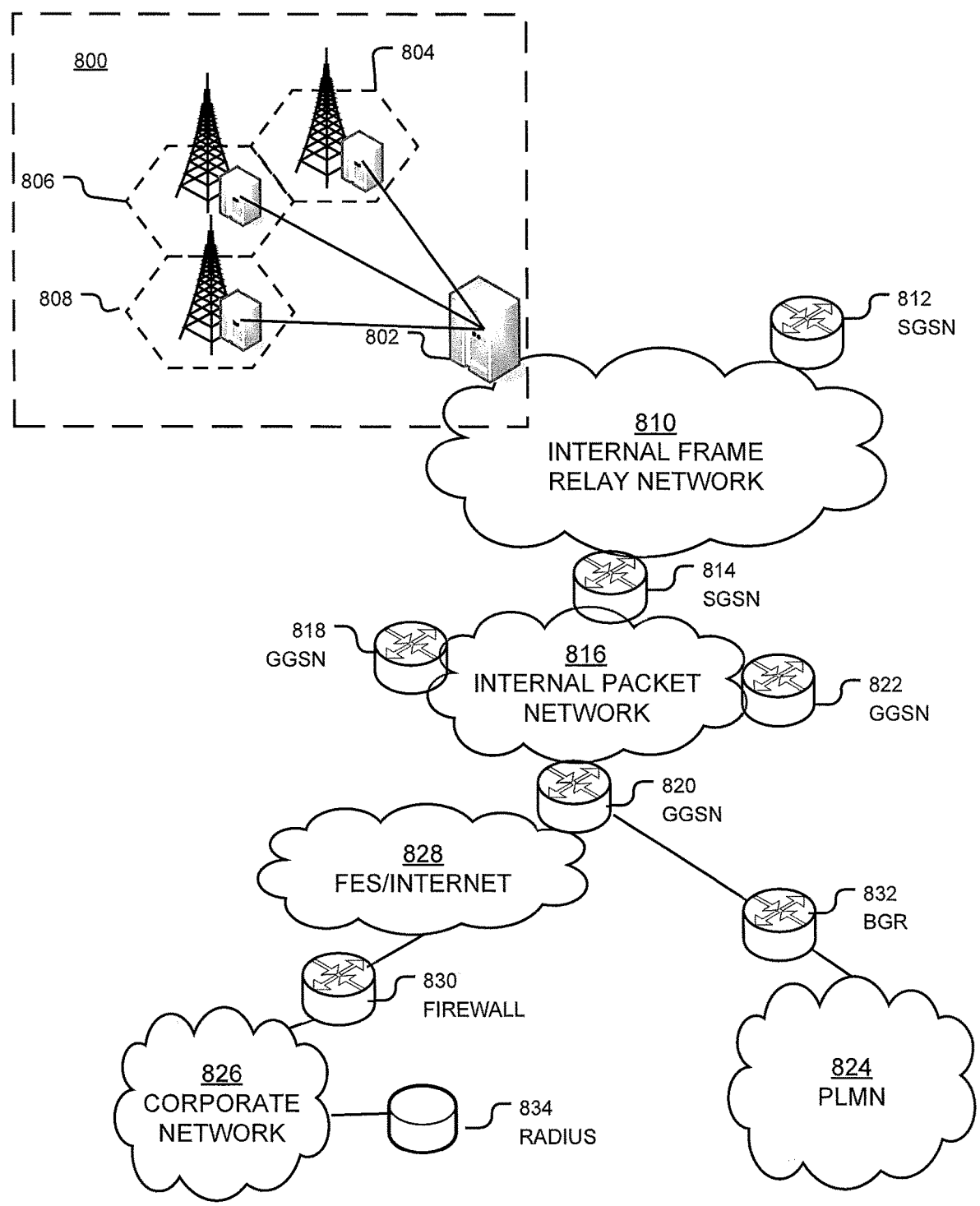
FIG. 8 depicts an overall block diagram of an example packet-based mobile cellular network environment, such as a general packet radio service (GPRS) network.

FIG. 8 depicts an overall block diagram of an example packet-based mobile cellular network environment, such as a GPRS network as described herein. In the example packet-based mobile cellular network environment shown in FIG. 8, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 9:
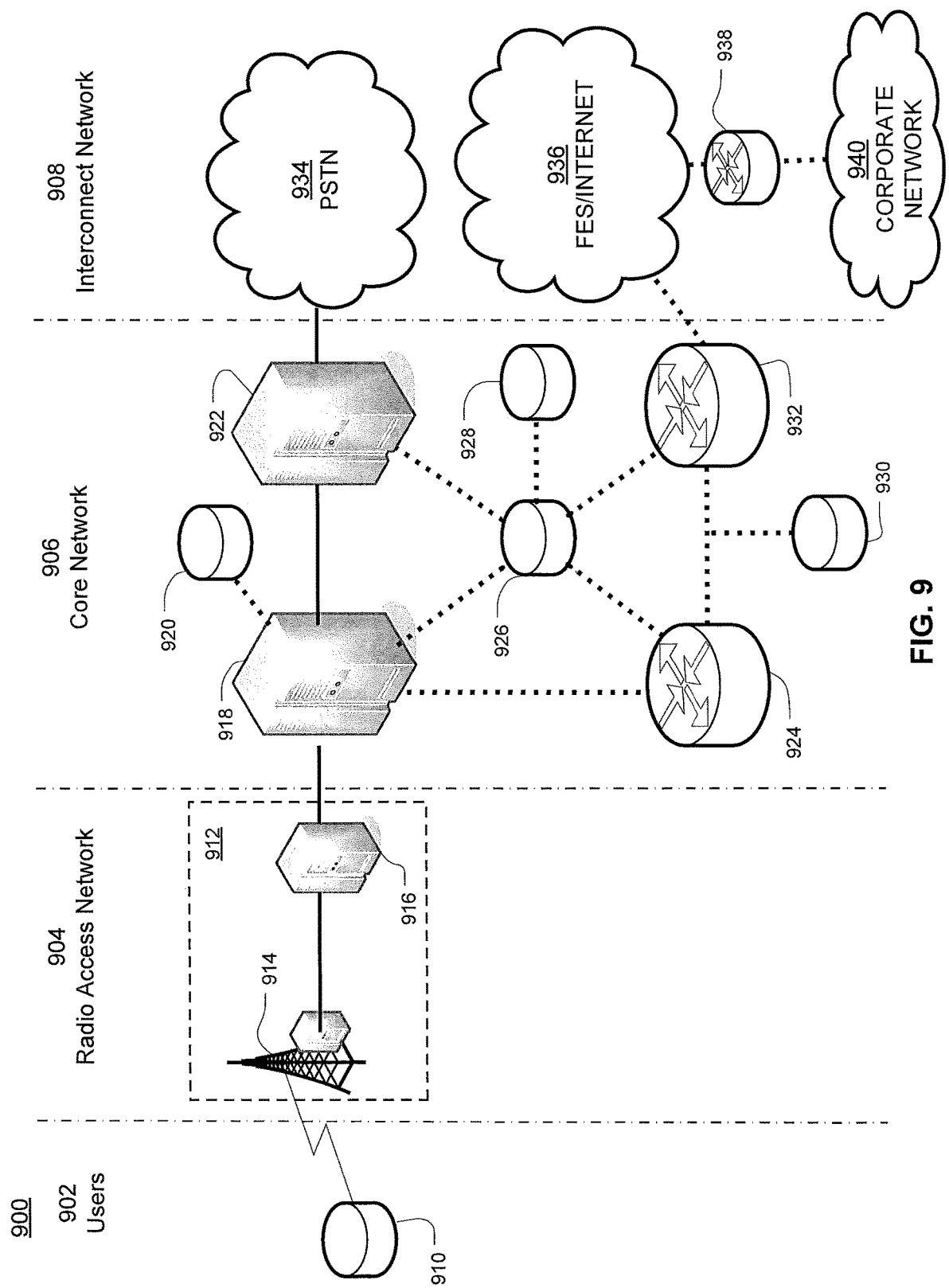
FIG. 9 illustrates an example architecture of a GPRS network.

FIG. 9 illustrates an architecture of a typical GPRS network 900 as described herein. The architecture depicted in FIG. 9 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 9. In an example, device 910 comprises a communications device (e.g., mobile device, mobile positioning center 116, network device 300 or other devices, various access devices, or the like, or any combination thereof). Radio access network 904 comprises a plurality of BSSs such as BSS 912, which includes a BTS 914 and a BSC 916. Core network 906 may include a host of various network elements. As illustrated in FIG. 9, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 9, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 9, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 10:
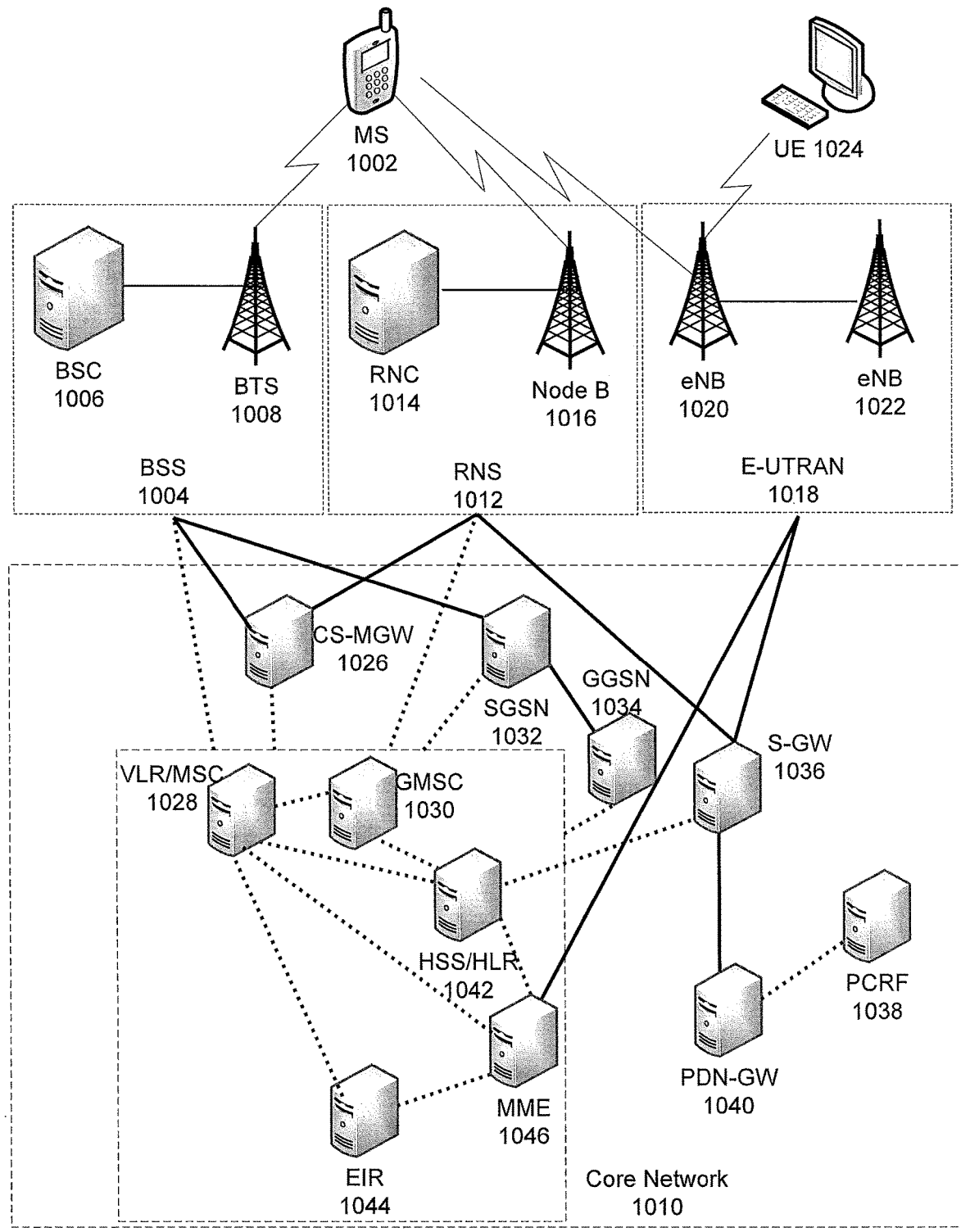
FIG. 10 is a block diagram of an example public land mobile network (PLMN).

FIG. 10 illustrates a PLMN block diagram view of an example architecture that may be replaced by a telecommunications system. In FIG. 10, solid lines may represent user traffic signals, and dashed lines may represent support signaling. MS 1002 is the physical equipment used by the PLMN subscriber. For example, a mobile device, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. A PCRF uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

What is claimed is:

1. A method, comprising:
   receiving, via a serving call session control function (S-CSCF), an initial registration request from a device;
   sending, by the S-CSCF, an initial challenge to the device, the initial challenge being a first session initiation protocol (SIP) message and including parameters to establish an encrypted connection;
   establishing, via a proxy call session control function (P-CSCF), an encrypted connection between the device and a network;
   interrogating, by an interrogating call session control function (I-CSCF), using a location database receiving information via the S-CSCF, a location code of the device authenticated to the network through the encrypted connection;
   determining, by the S-CSCF, whether the location code corresponds to an unencrypted region;
   if the location code does not correspond to an unencrypted region, registering the device to the network for communication using the encrypted connection;
   if the location code corresponds to an unencrypted region:
      sending, by the S-CSCF, an intercept challenge to the device to re-authenticate the device to the network, the intercept challenge being a second SIP message and including parameters to establish an unencrypted connection and a reason header;
      receiving, by the P-CSCF, re-registration information including unencrypted location information from the device using the unencrypted connection; and
      registering, by the S-CSCF, the device to the network using the unencrypted connection,
   wherein the first SIP message and the second SIP message have a same SIP code.

2. The method of claim 1, further comprising:
   establishing the unencrypted connection between the device and the network.

3. The method of claim 1, further comprising:
   receiving a subsequent registration request including encrypted location information using the encrypted connection, wherein the encrypted location information includes the location code.

4. The method of claim 1, wherein the location code is a Mobile Country Code (MCC).

5. The method of claim 1, wherein determining whether the location code corresponds to an unencrypted region comprises comparing the location code to a one or more codes in a location code database.

6. The method of claim 1, wherein the encrypted connection is a protected internet protocol security (IPsec) tunnel.

7. The method of claim 1, wherein the reason header includes a reason for the intercept challenge.

8. A non-transitory computer readable medium storing instructions that when executed by a processor cause performance of aspects comprising:
   receiving, via a serving call session control function (S-CSCF), an initial registration request from a device;
   sending an initial challenge to the device, the initial challenge being a first session initiation protocol (SIP) message and including parameters to establish an encrypted connection;
   establishing, via a proxy call session control function (P-CSCF), an encrypted connection between the device and a network;
   interrogating, using a location database receiving information via the S-CSCF, a location code of the device authenticated to the network through the encrypted connection;
   determining whether the location code corresponds to an unencrypted region;
   if the location code does not correspond to an unencrypted region, registering the device to the network for communication using the encrypted connection;
   if the location code corresponds to an unencrypted region:
   sending an intercept challenge to the device to re-authenticate the device to the network, the intercept challenge being a second session initiation protocol (SIP) message and including parameters to establish an unencrypted connection and a reason header;

receiving re-registration information including unencrypted location information from the device using the unencrypted connection; and registering the device to the network using the unencrypted connection, wherein the first SIP message and the second SIP message have a same SIP code.

9. The non-transitory computer readable medium of claim 8, the non-transitory computer readable medium storing instructions that when executed by a processor perform aspects further comprising:

establishing the unencrypted connection between the device and the network.

10. The non-transitory computer readable medium of claim 8, the non-transitory computer readable medium storing instructions that when executed by a processor perform aspects further comprising:

receiving an initial registration request from the device;

sending an initial challenge to the device, the initial challenge including parameters to establish the encrypted connection; and establishing the encrypted connection between the device and the network.

11. The non-transitory computer readable medium of claim 10, the non-transitory computer readable medium storing instructions that when executed by a processor perform aspects further comprising:

receiving a subsequent registration request including encrypted location information using the encrypted connection, wherein the encrypted location information includes the location code.

12. The non-transitory computer readable medium of claim 8, wherein the location code is a Mobile Country Code (MCC).

13. The non-transitory computer readable medium of claim 8, wherein determining whether the location code corresponds to an unencrypted region comprises comparing the location code to a one or more codes in a location code database.

14. The method of claim 1, wherein initial registration request from a device includes internet protocol security client data but does not include a private header having location information.

15. The method of claim 1, further comprising adding a flag to the intercept challenge to trigger the P-CSCF to disable encryption.

16. A call session control function (CSCF) system comprising:

at least one processor; and at least one memory coupled with the at least one processor, the at least one memory storing executable instructions that when executed by the at least one processor, cause the at least one processor to effectuate operations comprising:

receiving, via a serving call session control function (S-CSCF), an initial registration request from a device;

sending, by the S-CSCF, an initial challenge to the device, the initial challenge being a first session initiation protocol (SIP) message and including parameters to establish an encrypted connection;

establishing, via a proxy call session control function (P-CSCF), an encrypted connection between the device and a network;

interrogating, by an interrogating call session control function (I-CSCF), using a location database receiving information via the S-CSCF, a location code of the device authenticated to the network through the encrypted connection;

determining, by the S-CSCF, whether the location code corresponds to an unencrypted region;

if the location code does not correspond to an unencrypted region, registering the device to the network for communication using the encrypted connection;

if the location code corresponds to an unencrypted region:

sending, by the S-CSCF, an intercept challenge to the device to re-authenticate the device to the network, the intercept challenge being a second SIP message and including parameters to establish an unencrypted connection and a reason header;

receiving, by the P-CSCF, re-registration information including unencrypted location information from the device using the unencrypted connection; and registering, by the S-CSCF, the device to the network using the unencrypted connection, wherein the first SIP message and the second SIP message have a same SIP code.

17. The system of claim 16, wherein the at least one processor further effectuates operations comprising:

establishing the unencrypted connection between the device and the network.

18. The system of claim 16, wherein the at least one processor further effectuates operations comprising:

receiving a subsequent registration request including encrypted location information using the encrypted connection, wherein the encrypted location information includes the location code.

19. The system of claim 16, wherein determining whether the location code corresponds to an unencrypted region comprises comparing the location code to a one or more codes in a location code database.

20. The system of claim 16, wherein the encrypted connection is a protected internet protocol security (IPsec) tunnel.

* * * * *